UNITED STATES PATENT OFFICE.

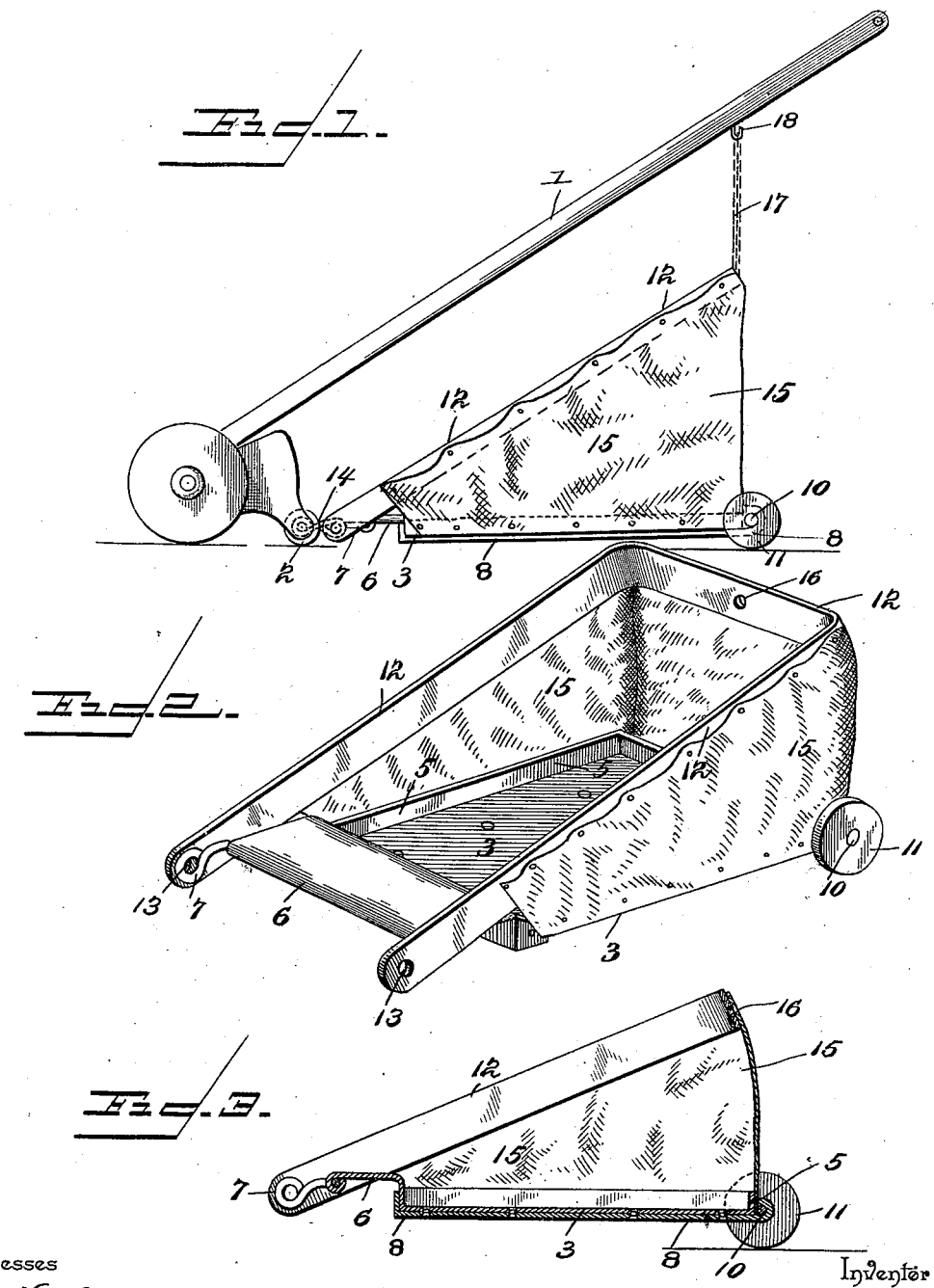

EARNEST R. COAX, OF CASTILE, NEW YORK, ASSIGNOR OF ONE-HALF TO JOHN W. SMITH, OF SAME PLACE.

LAWN-MOWER ATTACHMENT.

SPECIFICATION forming part of Letters Patent No. 512,157, dated January 2, 1894.

Application filed November 18, 1892. Serial No. 452,598. (No model.)

*To all whom it may concern:*

Be it known that I, EARNEST R. COAX, a citizen of the United States, residing at Castile, in the county of Wyoming and State of New York, have invented a new and useful Lawn-Mower Attachment, of which the following is a specification.

My invention relates to improvements in lawn-mower attachments, and has for its object to produce an attachment adapted to be conveniently secured in position so as to follow after the ordinary lawn-mower and receive the grass as the same is severed by the cutters of the mowers, whereby said grass is prevented from becoming scattered, and is simultaneously gathered with the cutting operation so that it may be subsequently dumped in convenient piles for gathering.

With these objects in view, the invention consists in certain novel features of construction hereinafter specified and particularly pointed out in the claims.

Referring to the drawings—Figure 1 is a side elevation of a lawn-mower, the same being provided with my improved attachment. Fig. 2 is a detail in perspective of the attachment. Fig. 3 is a longitudinal, vertical section of the same.

Like numerals of reference indicate like parts in all the figures of the drawings.

Referring to Fig. 1, 1 designates the handle of the mower, and 2 the usual roller that follows after the cutters or knives, the said mower being of well known construction, and forming no part of my present invention.

Referring more particularly to Figs. 2 and 3, 3 designates a platform, which is preferably formed of light sheet-metal, as for instance, zinc, iron or tin, and is provided at its opposite side and rear edges with upturned or vertical flanges 5, and at its front with an elevated shield 6, which is horizontally-disposed and provided at its two front corners with forwardly-disposed eyes 7. The bottom of the platform is preferably provided with a pair of longitudinally-disposed heavy iron straps 8, which may serve as runners for the platform but which are preferably used merely for strengthening the same and maintaining it in shape. The rear ends of the straps are bent up against the rear flange of the platform, and preferably embrace short axles 10, having small ground-wheels 11, that may be employed, if desired, for the purpose of supporting the rear end of the platform and obviating any drag that the latter might occasion and which would tend to increase the draft of the machine.

12 designates a U-shaped metallic frame, whose front ends or terminals are provided with perforations 13. These perforations, together with the eyes at the front of the shield of the platform are engaged or coupled together by means of wire links 14, that removably engage with the axle of the roller 2 of the mower, so that as the mower is moved along, the attachment is dragged thereafter. It will be seen that when in position upon the mower, the shield is directly in rear of the roller and hence terminates immediately in rear of the revolving cutters or knives, so that the grass as thrown backward by said revolving cutters or knives, instead of falling upon the roller, is caught by the shield and platform and accumulates in the latter.

A curtain 15 of canvas, or other textile material, surrounds the U-shaped frame to which its upper edge is connected, and has its lower edge connected to the perforated side and end flanges of the platform.

The center of the rear end of the U-shaped frame has a perforation 16, that is engaged by a chain 17, and this chain is designed to have any one of its links connected with a hook 18, that extends from the handle of the mower, so that as will be apparent, the attachment is adjustable vertically.

In operation, when the attachment has received a sufficient quantity of grass, or a convenient place has been reached for depositing the same, in order to secure such deposit, it is simply necessary to invert the mower and attachment, whereby the contents of the latter may fall to the ground in a pile, to be subsequently gathered if desired.

It will be seen from the foregoing description, that my attachment is of cheap and simple construction, is strong and durable, will not increase the weight or draft of the machine to any appreciable extent, and may be conveniently connected to the same without alteration of the machine, and is conveniently attached when desired.

Having described my invention, what I claim is—

1. The combination with the axle of the roller of a lawn-mower, of a metallic platform having upturned side and rear edges, and an elevated forwardly-disposed shield at its front end, the latter having its front corners provided with forwardly-disposed eyes, the U-shaped metallic frame terminating at its front ends in eyes aligning with those of the shield, the surrounding flexible curtain connected to the frame and edges of the platform, and wire-links passed through the perforations of the frame and the eyes and engaging the ends of the axle of the mower, substantially as described.

2. The combination with the axle of a lawn-mower roller, of the sheet-metal platform having upturned side and rear edges, and provided at its front end with an elevated forwardly-disposed shield for taking in rear of the roller, said shield having its fornt corners provided with forwardly-disposed eyes, the U-shaped metallic frame embracing the sides of the platform and elevated above the same, said frame having its front terminals perforated to align with the eyes of the shield, the flexible textile curtain connected to the frame and to the flanges of the platform, the wire-links connecting the eyes of the frame and platform with the axle of the roller, and adjusting devices between the frame and handle of the mower, substantially as described.

3. The combination with the axle of the roller of a lawn-mower, of the sheet-metal platform having a front elevated shield forwardly and horizontally extended therefrom, said shield terminating at its corners in eyes, metallic straps running parallel and longitudinally with the platform and secured to the under side thereof, axles extending from the straps whose rear ends are bent around the rear ends of the platform, wheels carried by the axles, a U-shaped frame arranged above the platform, and a curtain surrounding the frame and connected to the platform, substantially as described.

In testimony that I claim the foregoing as my own I have hereto affixed my signature in the presence of two witnesses.

EARNEST R. COAX.

Witnesses:
H. W. SMITH,
JOHN W. SMITH.